United States Patent
Matsutani et al.

(10) Patent No.: US 10,759,937 B2
(45) Date of Patent: Sep. 1, 2020

(54) POLYKETONE COMPOSITION INCLUDING EPOXY COMPOUND, CURED POLYKETONE, OPTICAL ELEMENT, AND IMAGE DISPLAY DEVICE

(71) Applicant: HITACHI CHEMICAL COMPANY, LTD., Tokyo (JP)

(72) Inventors: Hiroshi Matsutani, Tokyo (JP); Nanako Mizuguchi, Tokyo (JP); Satoshi Asaka, Chikusei (JP); Misao Inaba, Tokyo (JP); Yohei Ishikawa, Tokyo (JP); Keiko Kudoh, Tokyo (JP); Katsuya Maeyama, Yamagata (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 5 days.

(21) Appl. No.: 16/082,782

(22) PCT Filed: Mar. 1, 2017

(86) PCT No.: PCT/JP2017/008193
§ 371 (c)(1),
(2) Date: Sep. 6, 2018

(87) PCT Pub. No.: WO2017/154709
PCT Pub. Date: Sep. 14, 2017

(65) Prior Publication Data
US 2019/0077951 A1 Mar. 14, 2019

(30) Foreign Application Priority Data

Mar. 9, 2016 (JP) ................ 2016-046182

(51) Int. Cl.
| | | |
|---|---|---|
| *G02B 1/04* | (2006.01) | |
| *C08L 61/02* | (2006.01) | |
| *C08L 63/00* | (2006.01) | |
| *C08L 73/00* | (2006.01) | |
| *C08K 5/3445* | (2006.01) | |
| *C08G 16/00* | (2006.01) | |
| *C08K 5/1539* | (2006.01) | |

(52) U.S. Cl.
CPC ........... *C08L 61/02* (2013.01); *C08G 16/00* (2013.01); *C08K 5/1539* (2013.01); *C08K 5/3445* (2013.01); *C08L 63/00* (2013.01); *C08L 73/00* (2013.01); *G02B 1/04* (2013.01)

(58) Field of Classification Search
None
See application file for complete search history.

(56) References Cited

U.S. PATENT DOCUMENTS

| | | |
|---|---|---|
| 2010/0096196 A1 | 4/2010 | VanderVeen |
| 2015/0291729 A1* | 10/2015 | Ueno .......... C07D 307/60 523/455 |

FOREIGN PATENT DOCUMENTS

| | | |
|---|---|---|
| JP | S62-7730 A | 1/1987 |
| JP | H09-506648 A | 6/1997 |
| JP | H11-181081 A | 7/1999 |
| JP | 2005-272728 A | 10/2005 |
| JP | 2013-053194 A | 3/2013 |
| JP | 2013053194 A * | 3/2013 |
| WO | 2008/072630 A1 | 6/2008 |

OTHER PUBLICATIONS

Machine-generated English-language translation of JP-2013053194-A.*

* cited by examiner

*Primary Examiner* — Vu A Nguyen
(74) *Attorney, Agent, or Firm* — Fitch, Even, Tabin & Flannery, LLP

(57) ABSTRACT

A polyketone composition includes: (A) a polyketone having, in a main chain, a structural unit represented by the following Formula (I); and (B) an epoxy compound. In Formula (I), X represents a bivalent group that has from 1 to 50 carbon atoms and that may have a substituent group, Y represents a bivalent hydrocarbon group that has from 1 to 30 carbon atoms and that may have a substituent group, and n represents an integer from 1 to 1500.

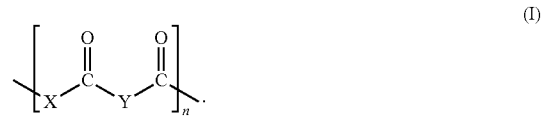

(I)

12 Claims, No Drawings

POLYKETONE COMPOSITION INCLUDING EPOXY COMPOUND, CURED POLYKETONE, OPTICAL ELEMENT, AND IMAGE DISPLAY DEVICE

CROSS-REFERENCE TO RELATED APPLICATIONS

This application is a U.S. national phase application filed under 35 U.S.C. § 371 of International Application No. PCT/JP2017/008193, filed Mar. 1, 2017, which claims priority from Japanese Patent Application No. 2016-046182, filed Mar. 9, 2016, designating the United States, which are hereby incorporated herein by reference in their entirety.

TECHNICAL FIELD

The present invention relates to a polyketone composition including an epoxy compound, a cured polyketone, an optical element, and an image display device.

BACKGROUND ART

Aromatic polyketones having aromatic rings and carbonyl groups in the main chain have excellent heat resistance and mechanical properties and are used as engineering plastics. Most polymers belonging to aromatic polyketones are aromatic polyether ketones polymerized by utilizing a nucleophilic aromatic substitution reaction, which also have an ether bond in the main chain. On the other hand, aromatic polyketones having no ether bond in the main chain can exhibit even more excellent heat resistance and chemical resistance than those of aromatic polyether ketones (see, for example, Patent Document 1 and Patent Document 2).

In recent years, it has been reported that an aromatic polyketone with high transparency and heat resistance can be obtained by directly polymerizing an alicyclic dicarboxylic acid and 2,2'-dialkoxybiphenyl compound by Friedel-Crafts acylation (see, for example, Patent Document 3), and application thereof to optical members is expected.

RELATED ART DOCUMENT

Patent Document

Patent Document 1: Japanese Patent Application Laid-Open (JP-A) No. 62-7730
Patent Document 2: JP-A No. 2005-272728
Patent Document 3: JP-A No. 2013-53194

SUMMARY OF INVENTION

Technical Problem

Optical members to which a resin material is applied are expected to have properties that inorganic materials can not exhibit. Examples of such properties include lightness and flexibility compared to inorganic materials. Examples of the application of the resin material include a coating material, a glass substitute material focusing the property of light weight, and a flexible display focusing the property of flexibility. In particular, realization of application to flexible displays has attracted particular attention in recent years.

Here, a molecular chain itself of an aromatic polyketone described in Patent Document 3 is stable to chemical solutions. However, when a film (aggregate) formed by using such an aromatic polyketone on a substrate is exposed to a chemical solution, the film (aggregate) may peel off from the substrate or dissolve, and such an aggregate has a practically problem in the chemical resistance.

The invention has been made in view of the above, and provides a polyketone composition and polyketone cured product having excellent heat resistance, transparency and excellent chemical resistance even when formed into a film (aggregate), and an optical element and an image display device including the polyketone cured product.

Solution to Problem

The present invention includes the following aspects.
<1> A polyketone composition containing:
  (A) a polyketone having, in a main chain, a structural unit represented by the following Formula (I); and
  (B) an epoxy compound.

In which, in Formula (I), X represents a bivalent group that has from 1 to 50 carbon atoms and that may have a substituent group, Y represents a bivalent hydrocarbon group that has from 1 to 30 carbon atoms and that may have a substituent group, and n represents an integer from 1 to 1500.
<2> The polyketone composition according to <1>, in which in Formula (I), X is a bivalent group that includes an aromatic ring and that has from 6 to 50 carbon atoms.
<3> The polyketone composition according to <1> or <2>, in which in Formula (I), X is a bivalent group represented by at least one selected from the group consisting of the following formula (II-1) to (II-3).

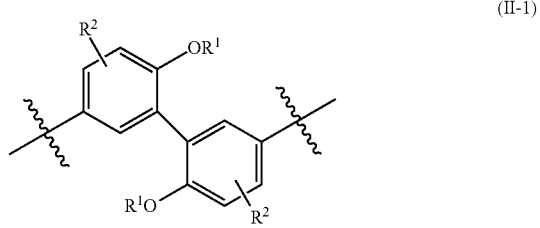

In which, in Formula (II-1), each $R^1$ independently represents a hydrogen atom or a hydrocarbon group that has from 1 to 30 carbon atoms and that may have a substituent group, and each $R^2$ independently represents a bivalent hydrocarbon group that has from 1 to 30 carbon atoms and that may have a substituent group,

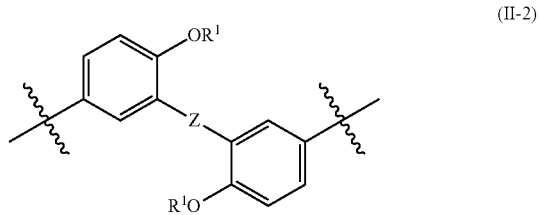

In which, in Formula (II-2), each $R^1$ independently represents a hydrogen atom or a hydrocarbon group that has from 1 to 30 carbon atoms and that may have a substituent group, and Z represents an oxygen atom or a bivalent group represented by the following formula (III-1) to (III-7),

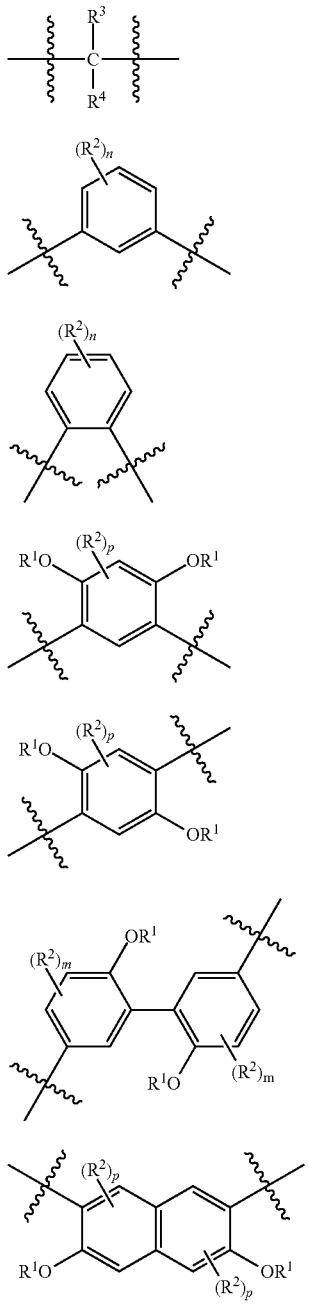

ger from 0 to 3, each n independently represents an integer from 0 to 4, and each p independently represents an integer from 0 to 2,

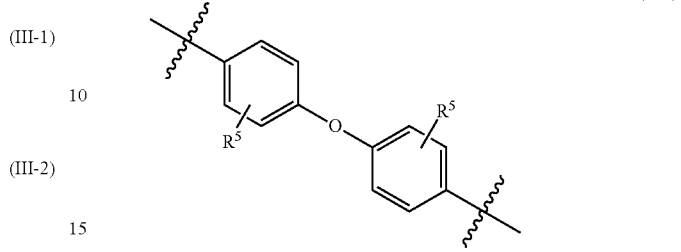

In which, in Formula (II-3), each $R^5$ independently represents a hydrogen atom or a hydrocarbon group that has from 1 to 30 carbon atoms and that may have a substituent group.

<4> The polyketone composition according to any one of <1> to <3>, in which, in Formula (I), Y is a bivalent saturated hydrocarbon group.

<5> The polyketone composition according to <4>, in which, in Formula (I), Y is a bivalent saturated hydrocarbon group having a cycloaliphatic hydrocarbon group.

<6> The polyketone composition according to any one of <1> to <5>, in which, in Formula (I), a carbon number of Y is from 6 to 30.

<7> The polyketone composition according to any one of <1> to <6>, in which (B) the epoxy compound includes an epoxy compound having from 2 to 4 of epoxy groups in a molecule.

<8> The polyketone composition according to any one of <1> to <7>, further containing a dicarboxylic anhydride.

<9> The polyketone composition according to any one of <1> to <8>, further containing a curing catalyst.

<10> The polyketone composition according to <9>, in which the curing catalyst includes an imidazole compound.

<11> The polyketone composition according to any one of <1> to <10>, further containing a solvent.

<12> A cured polyketone that is a cured product of the polyketon composition according to any one of <1> to <11>.

<13> An optical element including the cured polyketone according to <12>.

<14> An image display device including the cured polyketone according to <12>.

Advantageous Effects of Invention

According to the present invention, a polyketone composition and polyketone cured product having excellent heat resistance and transparency and excellent chemical resistance even when formed into a film (aggregate), and an optical element and an image display device including the polyketone cured product can be provided.

DESCRIPTION OF EMBODIMENTS

Hereinafter, embodiments of the present invention will be described in detail. However, the present invention is not limited to the following embodiments. In the following embodiments, the constituent elements (including the element processes and the like) are not indispensable except In which, in Formulae (III-1) to (III-7), each $R^1$ independently represents a hydrogen atom or a hydrocarbon group that has from 1 to 30 carbon atoms and that may have a substituent group, each $R^2$ independently represents a hydrocarbon group that has from 1 to 30 carbon atoms and that may have a substituent group, each of $R^3$ and $R^4$ independently represents a hydrogen atom or a hydrocarbon group that has from 1 to 30 carbon atoms and that may have a substituent group, each m independently represents an intewhen particularly explicitly mentioned. The same applies to numerical values and ranges thereof, and does not limit the present invention.

In the present disclosures, each numerical range specified using "(from) . . . to . . . " represents a range including the numerical values noted before and after "to" as the minimum value and the maximum value, respectively.

In the present disclosures, regarding numerical ranges stated hierarchically herein, the upper limit or the lower limit of a numerical range of a hierarchical level may be replaced with the upper limit or the lower limit of a numerical range of another hierarchical level.

Further, in the present disclosures, regarding a numerical range, the upper limit or the lower limit of the numerical range may be replaced with a relevant value shown in any of Examples.

In referring herein to a content of a component in a composition, when plural kinds of substances exist corresponding to a component in the composition, the content means, unless otherwise specified, the total amount of the plural kinds of substances existing in the composition.

In the present disclosures, the term "layer" or "film" comprehends herein not only a case in which the layer or the film is formed over the whole observed region where the layer or the film is present, but also a case in which the layer or the film is formed only on part of the region.

In the present disclosures, the term "layered" as used herein indicates "provided on or above", in which two or more layers may be bonded or detachable.

In the present disclosures, the term "process" denotes not only independent processes but also processes that cannot be clearly distinguished from other processes as long as a purpose is accomplished by the process.

In the present disclosures, the term "excellent transparency" means that the visible light transmittance (transmittance of visible light with a wavelength of 400 nm) is 80% or more (in terms of film thickness of 1 μm).

In the disclosures, the term "heat resistant" means that in a member containing a polyketone, a thermal decomposition temperature is 400° C. or higher.

In the disclosures, the term "chemical resistance of a film (aggregate)" means even when a film polyketone cured product (polyketone film) formed on a silicon substrate is exposed to a chemical solution, the polyketone film does not peel from the substrate and the polyketone film does not dissolve.

<Polyketone Composition>

A polyketone composition in the present embodiment contains; (A) a polyketone containing a structural unit represented by the following Formula (I) as a main chain (hereinafter, also referred to as "specific polyketone"), and (B) an epoxy compound.

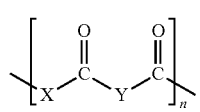
(I)

In Formula (I), X represents a bivalent group that has from 1 to 50 carbon atoms and that may have a substituent group, Y represents a bivalent hydrocarbon group that has from 1 to 30 carbon atoms and that may have a substituent group, and n represents an integer from 1 to 1,500.

The specific polyketone contains a carbonyl group in a main chain, and therefore is excellent in heat resistance and transparency. Since the main chain of the specific polyketone is formed by substantially C—C bonds, the molecular chain itself is stable to a chemical solution. By using a polyketone composition obtained by combining an epoxy compound with this specific polyketone, even when formed into a film (aggregate) while ensuring heat resistance and transparency, the film is excellent in chemical resistance to be practical.

Hereinafter, each component will be explained.

(A) Polyketone

The specific polyketone used in the present embodiment contains a structural unit represented by the following Formula (I) in the main chain.

(I)

In Formula (I), X represents a bivalent group that has from 1 to 50 carbon atoms and that may have a substituent group. In a case in which the bivalent group has the substituent, the term "a number of carbon atoms of the bivalent group" means a number which does not include a number of carbon atoms of the substituent. The same applies to the following description. Y represents a bivalent hydrocarbon group that has from 1 to 30 carbon atoms and that may have a substituent group. n represents an integer from 1 to 1,500, preferably 2 to 1,000, more preferably 3 to 1,000, and even more preferably 5 to 500.

Although the bivalent group represented by X may have a substituent, the main chain is preferably a hydrocarbon group. Examples of the substituent include a halogen atom, an alkoxy group having from 1 to 5 carbon atoms, and an acyl group having from 2 to 5 carbon atoms.

X in Formula (I) more preferably has an aromatic ring. In a case in which X has an aromatic ring, a heat resistance tends to be further improved. From the viewpoint of improving the heat resistance, X is preferably a bivalent group that has from 6 to 50 carbon atoms and has an aromatic ring.

Examples of the aromatic ring include a benzene ring, a naphthalene ring, an anthracene ring, a phenanthrene ring, a naphthacene ring, a chrysene ring, a pyrene ring, a triphenylene ring, a pentacene ring, and a benzopyrene ring.

Further, X more preferably includes a plurality of aromatic rings, and the plurality of aromatic rings are non-conjugated with each other, or bivalent groups having weak conjugate relationship with each other (hereinafter, also referred to as "specific aromatic ring group"). This can realize favorable diacylation at a low reaction temperature during synthesis of polyketone, resulting in polyketone having high molecular weight and excellent heat resistance. The specific aromatic ring group preferably has from 12 to 50 carbon atoms. Here, the term "a plurality of aromatic rings are non-conjugated with each other or have weak mutual conjugate relationship" means that two aromatic rings are bonded via an ether bond or a methylene bond, or conjugation between aromatic rings is suppressed by steric hindrance by a substituent like 2,2'-substituted biphenyl.

Examples of X include divalent groups represented by the following Formulae (II-1) to (II-3).

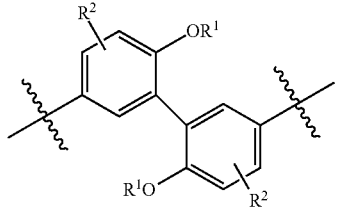
(II-1)

In Formula (II-1), each $R^1$ independently represents a hydrogen atom or a hydrocarbon group that has from 1 to 30 carbon atoms and that may have a substituent group, and each $R^2$ independently represents a hydrogen atom or a hydrocarbon group that has from 1 to 30 carbon atoms and may have a substituent. In a case in which the hydrocarbon group has a substituent, the term "a number of carbon atoms of the hydrocarbon group" means a number which does not include the number of carbon atoms of the substituent. The same applies to the following description. A wavy line means a bonding portion. The same applies to the following description.

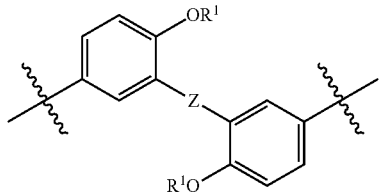
(II-2)

In Formula (II-2), each $R^1$ independently represents a hydrogen atom or a hydrocarbon group that has from 1 to 30 carbon atoms and that may have a substituent group, and Z represents an oxygen atom or a bivalent group represented by the following formula (III-1) to (III-7).

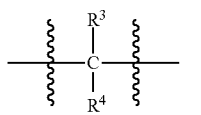
(III-1)

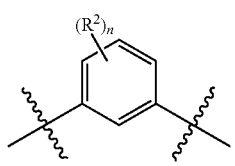
(III-2)

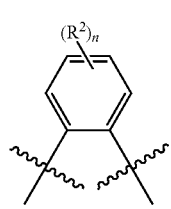
(III-3)

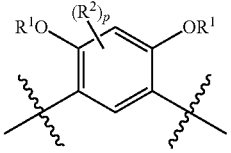
(III-4)

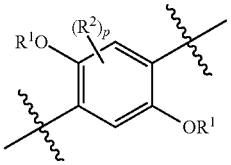
(III-5)

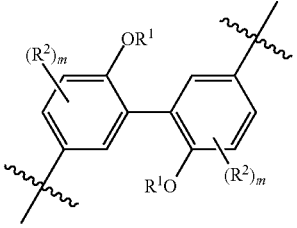
(III-6)

(III-7)

In Formulae (III-1) to (III-7), each $R^1$ independently represents a hydrogen atom or a hydrocarbon group that has from 1 to 30 carbon atoms and that may have a substituent group, each $R^2$ independently represents a hydrocarbon group that has from 1 to 30 carbon atoms and that may have a substituent group, each of $R^3$ and $R^4$ independently represents a hydrogen atom or a hydrocarbon group that has from 1 to 30 carbon atoms and that may have a substituent group, each m independently represents an integer from 0 to 3, each n independently represents an integer from 0 to 4, and each p independently represents an integer from 0 to 2.

From the viewpoint of heat resistance, each of $R^3$ and $R^4$ in Formula (III-1) is preferably hydrocarbon groups which has from 1 to 5 carbon atoms and may have a substituent. Examples of the hydrocarbon group having from 1 to 30 carbon atoms represented by $R^3$ and $R^4$ include the same hydrocarbon groups having from 1 to 30 carbon atoms as exemplified for $R^1$ in Formula (II-1). Examples of substituents that $R^3$ and $R^4$ may have include a halogen atom, an alkoxy group having from 1 to 5 carbon atoms, and an acyl group having from 2 to 5 carbon atoms.

Each n in Formulae (III-2) and (III-3) independently represents an integer from 0 to 4, preferably an integer from 0 to 2, and more preferably 0 or 1.

Each p in Formulae (III-4), (III-5), and (III-7) independently represents an integer from 0 to 2, and preferably 0 or 1.

Details of each of $R^1$, $R^2$, and m in Formula (II-2) are the same as $R^1$, $R^2$, and m in Formula (II-1).

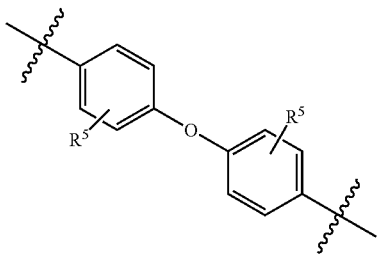

(II-3)

In Formula (II-3), each $R^5$ represents a hydrogen atom or a hydrocarbon group that has from 1 to 30 carbon atoms and that may have a substituent.

In Formula (II-1), each $R^1$ independently represents a hydrogen atom or a hydrocarbon group that has from 1 to 30 carbon atoms and that may have a substituent, and from the viewpoint of heat resistance, preferably a hydrocarbon group having from 1 to 10 carbon atoms, and more preferably a hydrocarbon group having from 1 to 5 carbon atoms.

Examples of the hydrocarbon group represented by $R^1$ include a saturated aliphatic hydrocarbon group, an unsaturated aliphatic hydrocarbon group, and an alicyclic hydrocarbon group.

Examples of the alicyclic hydrocarbon group represented by $R^1$ include: a cycloalkyl group such as a cyclohexyl group, a cycloheptyl group, a cyclooctyl group and a norbornyl group; and a cycloalkenyl group such as a cyclohexenyl group.

Examples of the saturated aliphatic hydrocarbon group represented by $R^1$ include a methyl group, an ethyl group, a n-propyl group, an isopropyl group, an n-butyl group, an isobutyl group, a sec-butyl group, a t-butyl group, an n-pentyl group, an isopentyl group, a sec-pentyl group, a neopentyl group, a t-pentyl group, an n-hexyl group, an n-heptyl group, an n-octyl group, an n-nonyl group, an n-decyl group, an n-eicosanyl group, and an n-triacontanyl group. Examples of the saturated aliphatic hydrocarbon group represented by $R^1$ also include those in which the above-described alicyclic hydrocarbon group has been introduced at a terminal portion of the saturated aliphatic hydrocarbon group.

Examples of the unsaturated aliphatic hydrocarbon group represented by $R^1$ include an alkenyl group such as a vinyl group or an allyl group, and an alkynyl group such as an ethynyl group. Examples of the unsaturated aliphatic hydrocarbon group represented by $R^1$ include those in which the alicyclic hydrocarbon group is introduced into a terminal portion of the unsaturated aliphatic hydrocarbon group.

In a case in which the hydrocarbon group represented by $R^1$ has a substituent, examples of the substituent include a halogen atom, an alkoxy group having from 1 to 5 carbon atoms, and an acyl group having from 2 to 5 carbon atoms.

In Formula (II-1), each $R^2$ independently represents a hydrogen atom or a hydrocarbon group that has from 1 to 30 carbon atoms and that may have a substituent, and from the viewpoint of heat resistance, preferably a hydrogen atom or a hydrocarbon group having from 1 to 10 carbon atoms, and more preferably a hydrogen atom or a hydrocarbon group having from 1 to 5 carbon atoms. Examples of such a hydrocarbon group include the same as those exemplified for $R^1$. Examples of the substituent include a halogen atom, an alkoxy group having from 1 to 5 carbon atoms, and an acyl group having from 2 to 5 carbon atoms.

In Formula (II-2), $R^1$ is the same as $R^1$ in Formula (II-1).

In Formula (III), each of $R^3$ and $R^4$ independently represent a hydrogen atom or a hydrocarbon group that has from 1 to 30 carbon atoms and that may have a substituent, and from the viewpoint of heat resistance, preferably a hydrocarbon group having from 1 to 10 carbon atoms, and more preferably a hydrocarbon group having from 1 to 5 carbon atoms. Examples of such a hydrocarbon group include the same as those exemplified for $R^1$. Examples of the substituent include a halogen atom, an alkoxy group having from 1 to 5 carbon atoms, and an acyl group having from 2 to 5 carbon atoms.

In Formula (II-3), each $R^5$ independently represents a hydrogen atom or a hydrocarbon group that has from 1 to 30 carbon atoms and that may have a substituent, and from the viewpoint of heat resistance, preferably a hydrocarbon group having from 1 to 10 carbon atoms, and more preferably a hydrocarbon group having from 1 to 5 carbon atoms. Examples of such a hydrocarbon group include the same as those exemplified for $R^1$. Examples of the substituent include a halogen atom, an alkoxy group having from 1 to 5 carbon atoms, and an acyl group having from 2 to 5 carbon atoms.

In the structural unit represented by Formula (I), Y represents a bivalent hydrocarbon group that has from 1 to 30 carbon atoms and that may have a substituent. The bivalent hydrocarbon group represented by Y preferably has from 1 to 30 carbon atoms, and more preferably from 6 to 30 from the viewpoint of heat resistance.

The bivalent group represented by Y is a hydrocarbon group, and preferably contains a saturated hydrocarbon group from the viewpoint of transparency. The saturated hydrocarbon group may be a saturated aliphatic hydrocarbon group or a saturated alicyclic hydrocarbon group. From the viewpoint of achieving both of higher heat resistance and transparency, the bivalent group represented by Y preferably contains a saturated alicyclic hydrocarbon group. In a case in which Y contains a bulky alicyclic hydrocarbon group, Y tends to be excellent in solubility in an epoxy compound as the component (B) and in a solvent, while maintaining high heat resistance and transparency. The bivalent group represented by Y may be a plurality of aliphatic hydrocarbon groups, a plurality of alicyclic hydrocarbon groups, or a combination thereof.

Examples of the saturated aliphatic hydrocarbon group include a methylene group, an ethylene group, a trimethylene group, a methylethylene group, a tetramethylene group, an n-methyltrimethylene group, an ethylethylene group, a dimethylethylene group, a pentylene group, an n-methyltetramethylene group, an n-ethyltrimethylene group, an n,n-dimethyltrimethylene group, a propyl ethylene group, an ethyl methylethylene group, a hexylene group, an n-methylpentylene group, an n-ethyltetramethylene group, an n-propyltrimethylene group, a butyl ethylene group, an n,n-dimethyltetramethylene group, a trimethyltrimethylene group, an n,n-ethylmethyltrimethylene group, a heptylene group, an octylene group, a nonylene group, a decylene group, an icosanylene group, and a triacontylene group.

From the viewpoint of heat resistance, examples of the saturated aliphatic hydrocarbon group include a hexylene group, an n-methylpentylene group, an n-ethyltetramethylene group, an n-propyltrimethylene group, a butylethylene group, an n,n-dimethyl tetramethylene group, a trimethyltrimethylene group, an n,n-ethylmethyltrimethylene group, a heptylene group, an octylene group, a nonylene group, a decylene group, an icosanylene group, and a triacontylene group.

Examples of the saturated alicyclic hydrocarbon group include a divalent group containing a cyclopropane structure, a cyclobutane structure, a cyclopentane structure, a cyclohexane structure, a cycloheptane structure, a cyclooctane structure, a cuban structure, a norbornane structure, a tricyclo [5.2.1.0] decane structure, an adamantane structure, a diadamantane structure, and a bicyclo [2.2.2] octane structure.

From the viewpoint of heat resistance, examples of the saturated alicyclic hydrocarbon group include a divalent group such as a cyclohexane structure, a cycloheptane structure, a cyclooctane structure, a cuban structure, a norbornane structure, a tricyclo [5.2.1.0] decane structure, an adamantane structure, a diadamantane structure, or a bicyclo [2.2.2] octane structure.

In a case in which the divalent group represented by Y has a substituent, examples of the substituent include an amino group, an oxo group, a hydroxyl group, and a halogen atom.

Y is preferably a bivalent group represented by at least one selected from the group consisting of the following Formulae (V-1) and (V-2). In a case in which Y is a bivalent group represented by at least one selected from the group consisting of the following Formulae (V-1) and (V-2), a flexible film (aggregate) tends to be obtained.

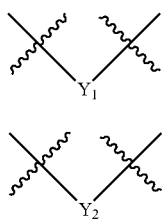

(V-1)

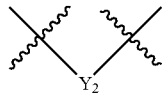

(V-2)

In Formula (V-1), $Y_1$ represents a bivalent alicyclic hydrocarbon group that has from 3 to 30 carbon atoms and that may have a substituent, and in Formula (V-2), $Y_2$ represents an alkylene group that has from 1 to 30 carbon atoms and that may have a substituent.

A number of carbon atoms of the alicyclic hydrocarbon group represented by $Y_1$ is from 3 to 30, preferably from 4 to 30, and more preferably from 6 to 30. Examples of the bivalent alicyclic hydrocarbon group having from 3 to 30 carbon atoms represented by $Y_1$ include a bivalent group having a cyclopropane structure, a cyclobutane structure, a cyclopentane structure, a cyclohexane structure, a cycloheptane structure, a cyclooctane structure, a cuban structure, a norbornane structure, a tricyclo [5.2.1.0] decane structure, an adamantane structure, a diadamantane structure, and a bicyclo [2.2.2] octane structure. From the viewpoint of solubility, a bivalent group having an adamantane structure is preferable.

In a case in which the bivalent alicyclic hydrocarbon group represented by $Y_1$ has a substituent, examples of the substituent include an amino group, an oxo group, a hydroxyl group, and a halogen atom.

A number of carbon atoms of the alkylene group represented by $Y_2$ is from 1 to 30, and preferably from 2 to 30.

Examples of the alkylene group having from 1 to 30 carbon atoms represented by $Y_2$ include a methylene group, an ethylene group, a trimethylene group, a methylethylene group, a tetramethylene group, a 1-methyltrimethylene group, a 2-methyltrimethylene group, an ethyl ethylene group, a 1,1-dimethylethylene group, a 1,2-dimethylethylene group, a pentylene group, a 1-methyltetramethylene group, a 2-methyltetramethylene group, a 1-ethyltrimethylene group, a 2-ethyltrimethylene group, a 1,1-dimethyltrimethylene group, a 2,2-dimethyltrimethylene group, a 1,2-dimethyltrimethylene group, a propylethylene group, an ethylmethylethylene group, a hexylene group, a 1-methylpentylene group, a 2-methylpentylene group, a 3-methylpentylene group, a 1-ethyltetramethylene group, a 2-ethyltetramethylene group, a 1-propyltrimethylene group, a 2-propyltrimethylene group, a butylethylene group, a 1,1-dimethyltetramethylene group, a 2,2-dimethyltetramethylene group, a 1,2-dimethyltetramethylene group, a 1,3-dimethyltetramethylene group, a 1,4-dimethyltetramethylene group, a 1,2,3-trimethyltrimethylene group, a 1,1,2-trimethyltrimethylene group, a 1,1,3-trimethyltrimethylene group, a 1,2,2-trimethyltrimethylene group, a 1-ethyl-1-methyltrimethylene group, a 2-ethyl-2-methyltrimethylene group, a 1-ethyl-2-methyltrimethylene group, a 2-ethyl-1-methyltrimethylene group, a heptylene group, an octylene group, a nonylene group, a decylene group, an icosanylene group, and a triacontanylene.

In a case in which the alkylene group represented by $Y_2$ has a substituent, examples of the substituent include an amino group, an oxo group, a hydroxyl group, and a halogen atom.

Further, Y is preferably a bivalent group represented by the following Formula (IV). In a case in which Y is a group represented by Formula (IV), a flexible film (aggregate) tends to be obtained.

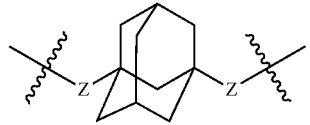

(IV)

In Formula (IV), hydrogen atom(s) of the adamantane structure may be substituted with a hydrocarbon group, an amino group, an oxo group, a hydroxyl group, or a halogen atom. Each Z independently represents a bivalent saturated hydrocarbon group that has from 1 to 10 carbon atoms and that may have a substituent. From the viewpoint of heat resistance, Z is preferably a saturated hydrocarbon group having from 1 to 5 carbon atoms. Due to the presence of Z, in a case in which the composition is made into a film (aggregate), the film becomes flexible.

Examples of the bivalent hydrocarbon group represented by Z include a methylene group, an ethylene group, a trimethylene group, a methylethylene group, a tetramethylene group, a 1-methyltrimethylene group, a 2-methyltrimethylene group, an ethyl ethylene group, a 1,1-dimethylethylene group, a 1,2-dimethylethylene group, a pentylene group, a 1-methyltetramethylene group, a 2-methyltetramethylene group, a 1-ethyltrimethylene group, a 2-ethyltrimethylene group, a 1,1-dimethyltrimethylene group, a 2,2-dimethyltrimethylene group, a 1,2-dimethyltrimethylene group, a propyl ethylene group, an ethyl methylethylene group, a hexylene group, a 1-methylpentylene group, a 2-methylpentylene group, a 3-methylpentylene group, a 1-ethyltetramethylene group, a 2-ethyltetramethylene group, a 1-propyl trimethylene group, a 2-propyl trimethylene group, a butyl ethylene group, a 1,1-dimethyl tetramethylene group, a 2,2-dimethyltetramethylene group, a 1,2-dimethyltetramethylene group, a 1,3-dimethyltetramethylene group, a 1,4-dimethyltetramethylene group, a 1,2,3-trimethyltrimethylene group, a 1,1,2-trimethyltrimethylene group, a 1,1,3-trimethyltrimethylene group, a 1,2,2-trimethyltrimethylene group, a 1-ethyl-1-methyltrimethylene group, a 2-ethyl-2-methyltrimethylene group, a 1-ethyl-2-methyltrimethylene group, a 2-ethyl-1-methyltrimethylene group, a heptylene group, an octylene group, a nonylene group, and a decylene group.

In a case in which the bivalent saturated hydrocarbon group represented by Z has a substituent, examples of the substituent include a halogen atom, an alkoxy group having 1 to 5 carbon atoms, and an acyl group having 2 to 5 carbon atoms.

As the specific polyketone, one synthesized by a known method can be used.

From the viewpoint of maintaining heat resistance, a weight average molecular weight (Mw) of the specific polyketone is preferably 500 or more in standard GPC (gel permeation chromatography) in terms of polystyrene, and from the viewpoint of higher heat resistance and solubility in (B) an epoxy compound and a solvent, the weight average molecular weight is more preferably from 10,000 to 1,000,000. In a case in which higher heat resistance is demanded, the weight average molecular weight (Mw) is more preferably from 30,000 to 1,000,000. The weight average molecular weight (Mw) of the specific polyketone is a value measured by the method described in Examples.

The specific polyketone may be used singly or in combination of two or more kinds thereof.

The polyketone (A) may contain a polyketone other than the specific polyketone. From the viewpoint of achieving an effect of the present invention, a content of the specific polyketone in a total amount of (A) polyketone is preferably 50% by mass or more, more preferably 60% by mass or more, and still more preferably 70% by mass or more.

From the viewpoints of heat resistance, transparency, and chemical resistance of a film (aggregate), a content of (A) the polyketone is preferably from 50 parts by mass to 99 parts by mass, and more preferably from 50 parts by mass to 95 parts by mass, based on 100 parts by mass of a total amount of (A) polyketone and (B) epoxy compound.

(B) Epoxy Compound

The epoxy compound (B) is not particularly limited as long as heat resistance, transparency, and chemical resistance of a film (aggregate) are maintained, and examples thereof include a compound having an alicyclic epoxy moiety and an oxirane ring.

The epoxy compound having an alicyclic epoxy moiety is not particularly limited as long as the compound is a compound having an alicyclic epoxy moiety in the molecule. As the alicyclic epoxy moiety, one having an oxygen atom bonded to two adjacent carbon atoms constituting the cyclic aliphatic structure can be used. From the viewpoint of reactivity and storage stability, it is preferable to use an alicyclic epoxy moiety formed by bonding an oxygen atom to two adjacent carbon atoms. The cyclic aliphatic structure may be, for example, a 3-membered to 18-membered ring, preferably a 5- to 8-membered ring, more preferably a 5-membered ring or a 6-membered ring, and still more preferably a 6-membered ring. Examples of the alicyclic epoxy moiety include a 3,4-epoxycyclohexyl group.

The epoxy compound having an oxirane ring is not particularly limited as long as the compound is a compound having an oxirane ring (ethylene oxide).

A number of alicyclic epoxy moieties and oxirane rings (hereinafter, also collectively referred to as "epoxy groups") in the epoxy compound molecule is not particularly limited. From the viewpoint of the chemical resistance of a film (aggregate), (B) the epoxy compound is preferably an epoxy compound having from 2 to 4 epoxy groups in the molecule.

Examples of the epoxy compound include a compound (B1) having one epoxy group in the molecule, a compound (B2) having two epoxy groups in the molecule, a compound (B3) having three epoxy groups in the molecule, a compound (B4) having four epoxy groups in the molecule, and an oligomer (B5) having an epoxy group.

Examples of the compound (B1) having one epoxy group in the molecule include the following compounds. In the compounds shown below, "Me" represents a methyl group and "Et" represents an ethyl group.

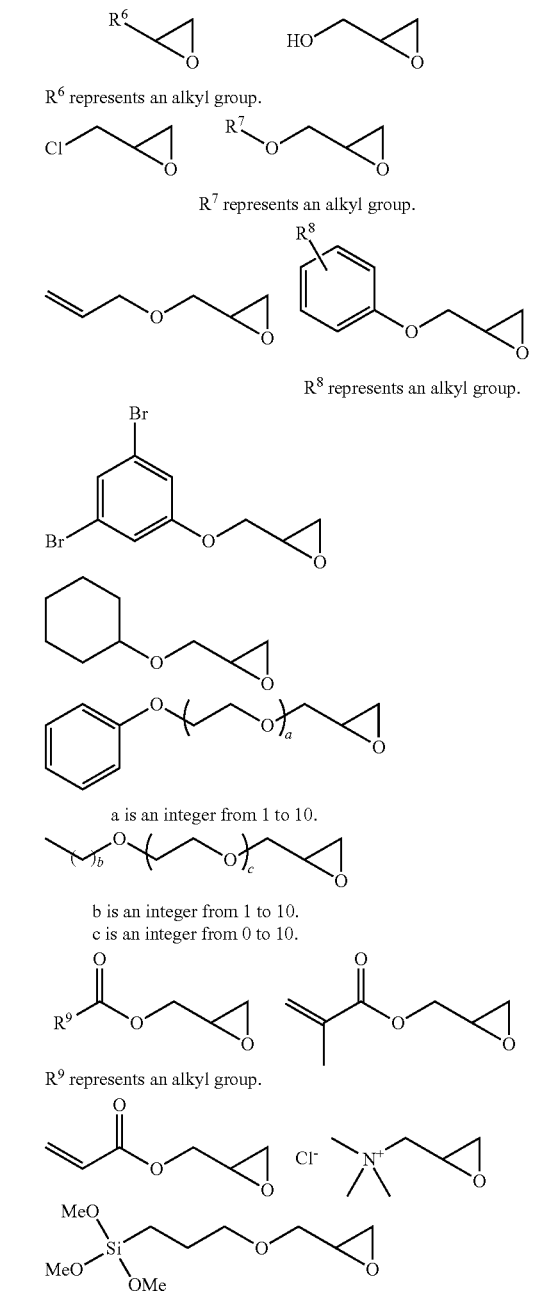

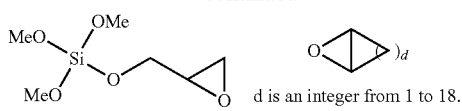
d is an integer from 1 to 18.
Examples of the compound (B2) having two epoxy groups in the molecule include the following compounds.
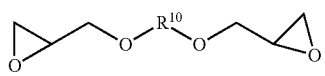
(5)
In Formula (5), $R^{10}$ represents a bivalent organic group shown below.
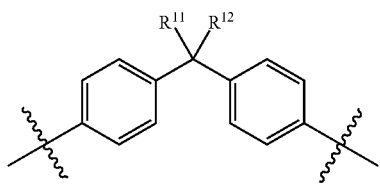
Each of $R^{11}$ and $R^{12}$ independently represents an hygrogen atom or an alkyl group having from 1 to 12 carbon atoms.
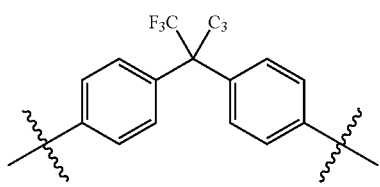
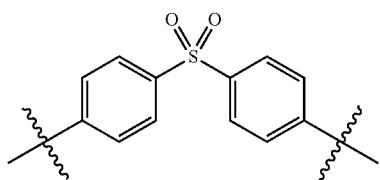
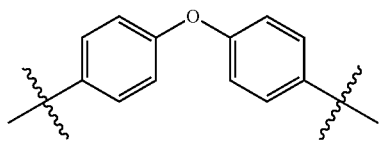
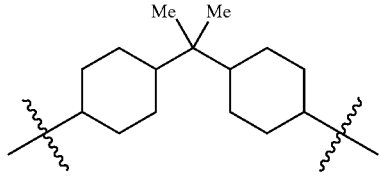
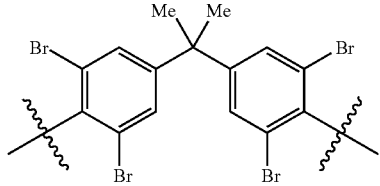
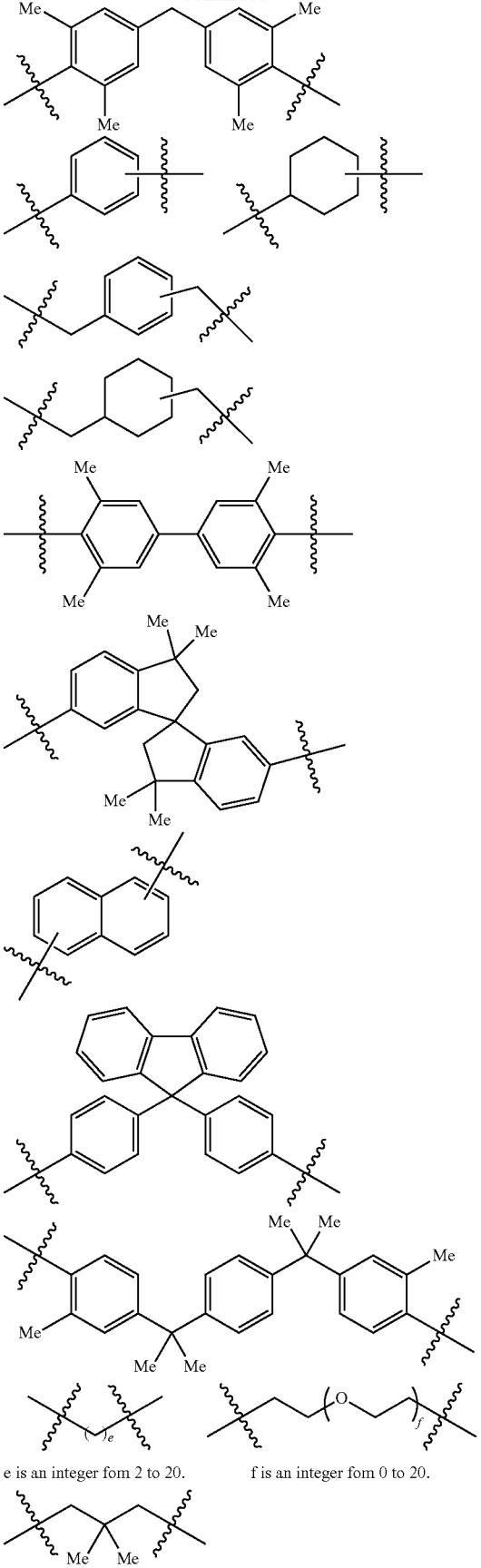
e is an integer fom 2 to 20.   f is an integer fom 0 to 20.

-continued
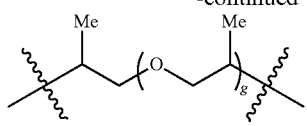
g is an integer fom 0 to 20.
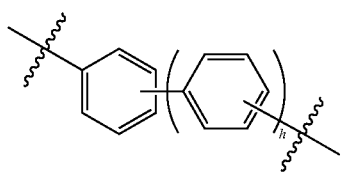
h is an integer fom 1 to 5.
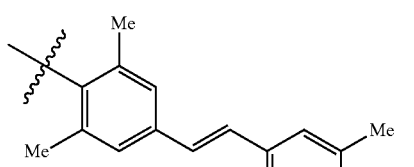
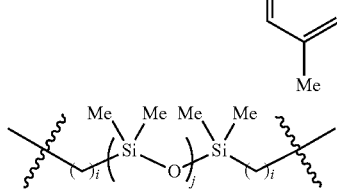
i is an integer fom 2 to 20.
j is an integer fom 1 to 20.
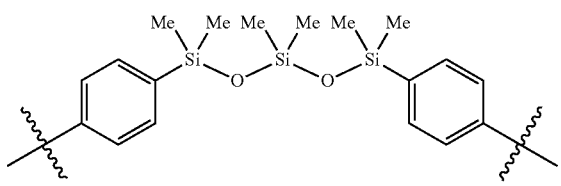
f is preferably an integer from 1 to 20.
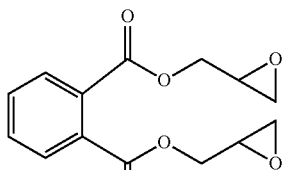
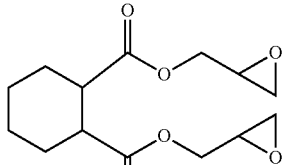
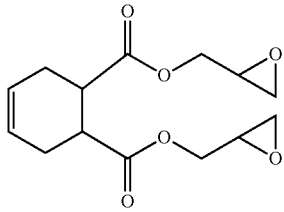
-continued
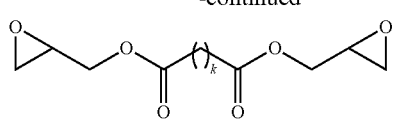
k is an integer fom 0 to 20.
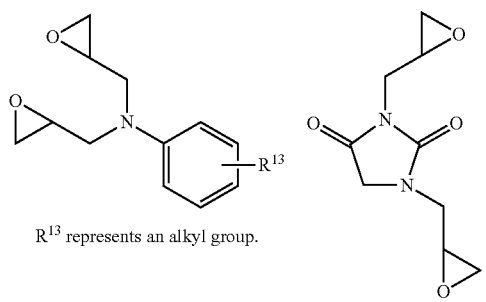
$R^{13}$ represents an alkyl group.
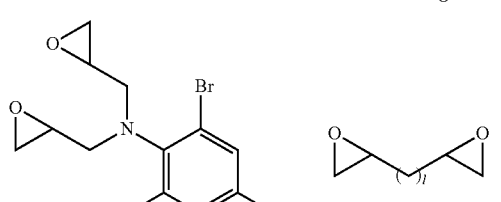
l is an integer fom 0 to 20.
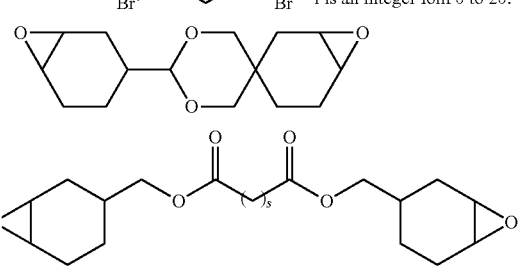
s is an integer fom 0 to 20.
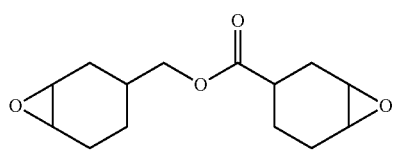
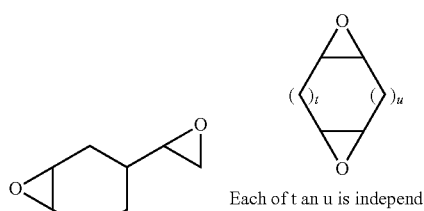
Each of t an u is independently an integer of 0 to 5.
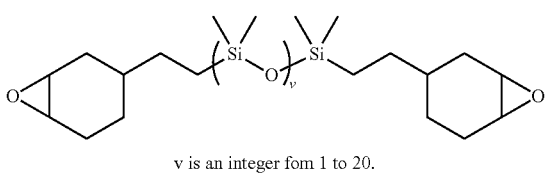
v is an integer fom 1 to 20.

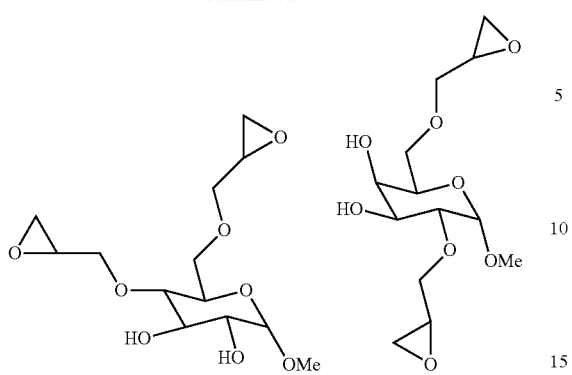

Each of k and s is preferably independently an integer from 1 to 20.

Examples of the compound (B3) having three epoxy groups in the molecule include the following compounds.

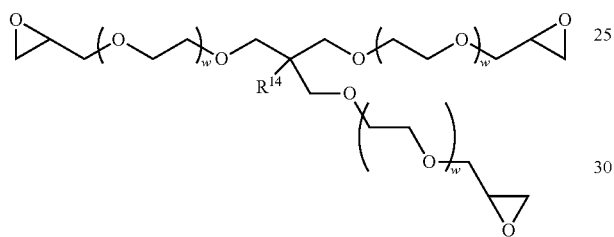

$R^{14}$ represents H, Me, or Et.
w is an integer from 0 to 20.

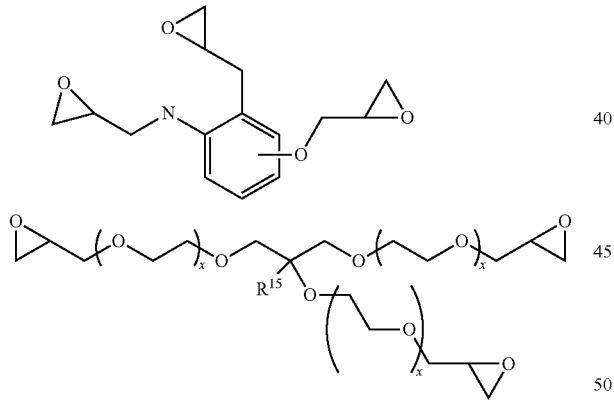

$R^{15}$ represents H, Me, or Et.
x is an integer from 0 to 20.

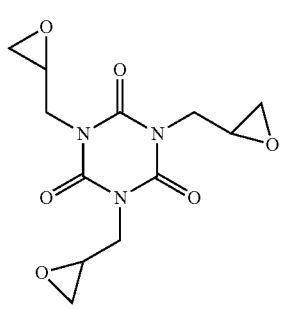

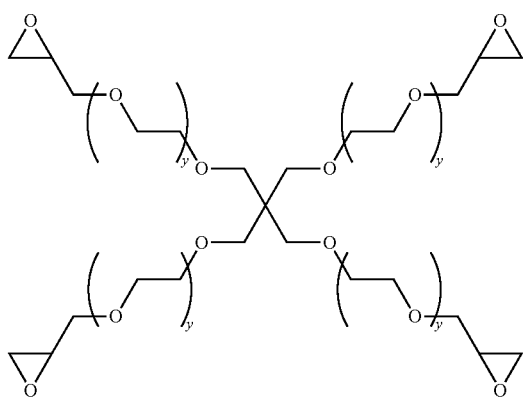

Examples of the compound (B4) having four epoxy groups in the molecule include the following compounds.

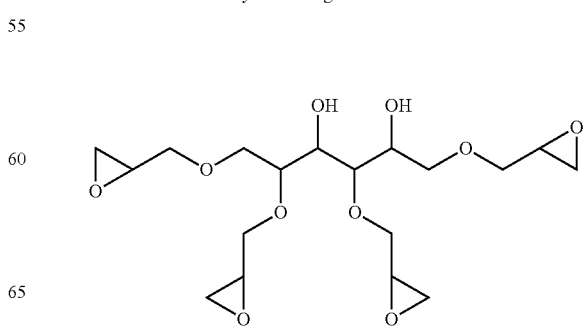

y is an integer from 0 to 20.

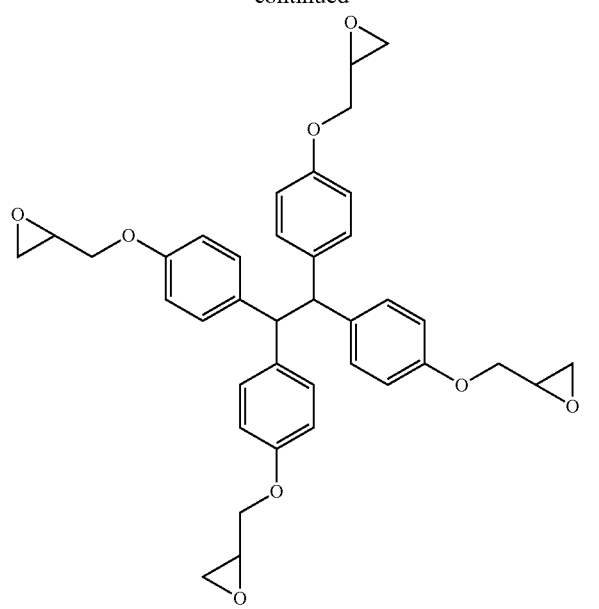
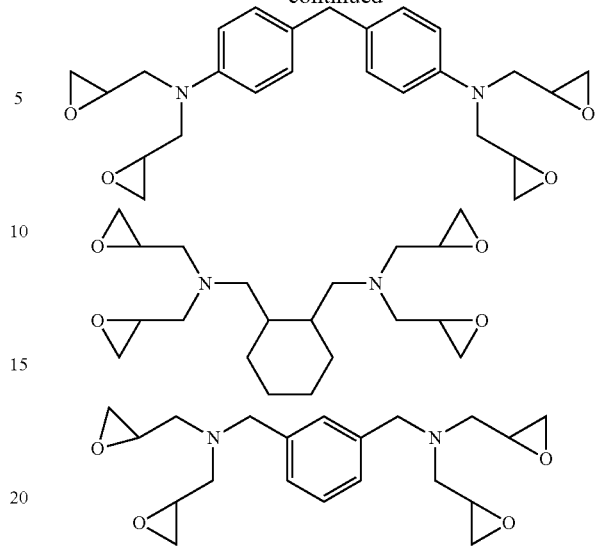
Examples of the oligomer (B5) having an epoxy group include the following compounds.
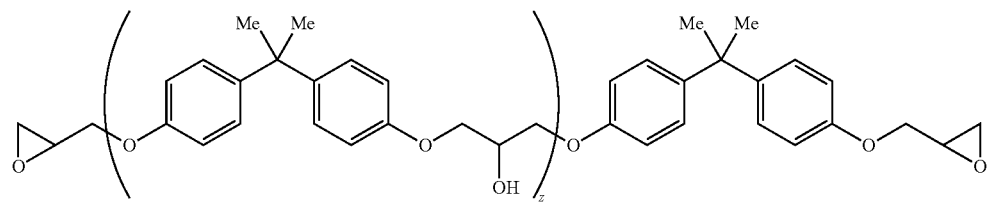
z is from 0 to 4.
z may be 0 < z < 40.
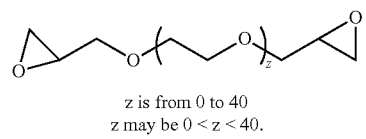
z is from 0 to 40
z may be 0 < z < 40.
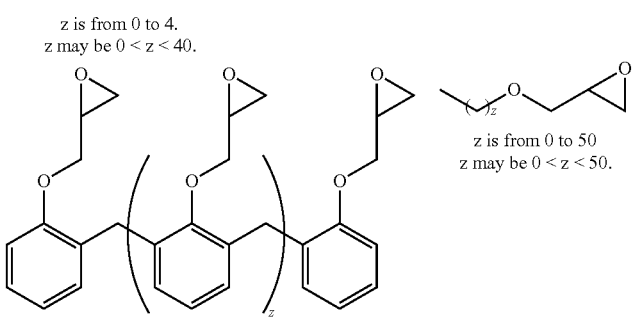
z is from 0 to 50
z may be 0 < z < 50.
z is from 0 to 2.
z may be 0 < z < 2.
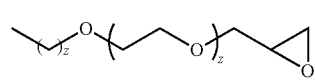
Each of z is independently from 0 to 15
z may be 0 < z < 15.
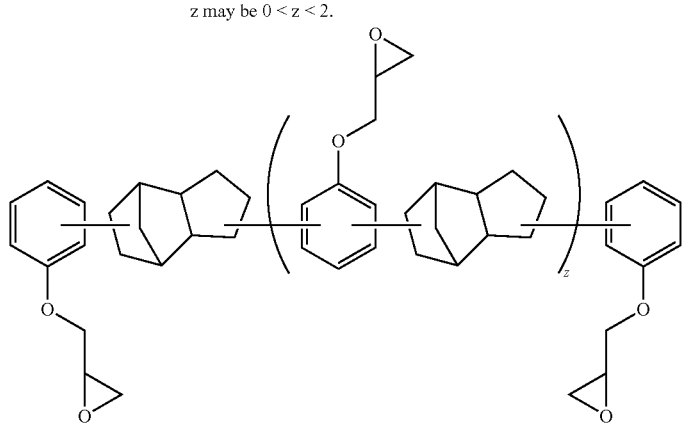
z is from 0 to 2.
z may be 0 < z < 2.

An epoxy equivalent of the oligomer (B5) having an epoxy group is preferably from 43 g/eq to 1000 g/eq. In a case in which the epoxy equivalent is 43 g/eq or more, an oxirane compound can be formed, and in a case in which the epoxy equivalent is 1,000 g/eq or less, the chemical resistance of the film (aggregate) tends to be more excellent.

A method of measuring the epoxy equivalent in the disclosure is described below.

An epoxy resin is dissolved in methyl ethyl ketone to form a solution. Glacial acetic acid, cetyl trimethyl ammonium bromide, and a screen indicator (prepared by mixing a solution obtained by dissolving 0.3 g of batten blue in 100 ml of glacial acetic acid and a solution obtained by dissolving 1.5 g of thymol blue in 500 ml of methanol) are added to the solution, titration is carried out using a perchloric acid solution adjusted to 0.1 N, and the end point is evaluated as a point where pink color has lasted 1 minute is set after a color of the solution changed to pink. Meanwhile, a blank test is conducted and the epoxy equivalent is calculated from the following Formula.

$$\text{Epoxy equivalent (g/eq)} = (1000 \times W)/\{(S-B) \times N\}$$

W: sample mass

B: amount of 0.1 N perchloric acid solution used for blank test

S: amount of 0.1 N perchloric acid solution used for titration of sample

N: normality of perchloric acid solution (0.1 N)

From the viewpoint of achieving both heat resistance and transparency, it is more preferable to use an epoxy compound having at least one selected from the group consisting of a bisphenol structure, an aminophenol structure, and an alicyclic structure.

These (B) epoxy compounds may be used singly or may be used in combination of two or more kinds thereof.

From the viewpoints of heat resistance and chemical resistance of a film (aggregate), a content of the (B) epoxy compound is preferably from 1 part by mass to 50 parts by mass, and more preferably from 5 parts by mass to 50 parts by mass, based on a total amount of the (A) polyketone and the (B) epoxy compound 100 parts by mass.

(C) Dicarboxylic Acid Anhydride

The polyketone composition may further contain a (C) dicarboxylic acid anhydride. The (C) dicarboxylic acid anhydride is a curing agent for the (B) epoxy compound and a stronger cured product can be obtained, and therefore, the chemical resistance of the film (aggregate) tends to be improved.

Examples of the dicarboxylic acid anhydride include phthalic anhydride (3-methylhexahydrophthalic anhydride, 4-methylhexahydrophthalic anhydride, or the like), maleic anhydride, trimellitic anhydride, pyromellitic anhydride, hexahydrophthalic anhydride, tetrahydrophthalic anhydride, methylnadic anhydride, nadic anhydride, glutaric anhydride, dimethyl glutaric anhydride, diethyl glutaric anhydride, succinic anhydride, methyl hexahydrophthalic anhydride, methyl tetrahydro phthalic anhydride, norbornene dicarboxylic anhydride, methyl norbornene dicarboxylic anhydride, norbornane dicarboxylic anhydride, and methyl norbornane dicarboxylic anhydride.

From the viewpoint of obtaining a stronger cured product, an anhydride acid equivalent of the acid anhydride is preferably from 90 g/eq to 400 g/eq, more preferably from 100 g/eq to 350 g/eq, and still more preferably from 100 g/eq to 300 g/eq. The term "Anhydride acid equivalent" is represented by (molecular weight of acid anhydride)/(number of anhydrous groups in acid anhydride molecule).

These (C) dicarboxylic acid anhydrides may be used singly, or in combination of two or more kinds thereof.

From the viewpoints of heat resistance, transparency and chemical resistance of a film (aggregate), in a case in which a (C) dicarboxylic acid anhydride is contained, a content of the (C) the dicarboxylic acid anhydride is preferably from 60 parts by mass to 120 parts by mass and more preferably from 70 parts by mass to 100 parts by mass based on 100 parts by mass of the epoxy compound (B).

(D) Curing Catalyst (Curing Accelerator)

The polyketone composition may further contain a (D) curing catalyst (curing accelerator). By containing the (D) curing catalyst (curing accelerator), the ring-opening reaction of the (B) epoxy compound is promoted and a stronger cured product is obtained, and therefore, the chemical resistance of a film (aggregate) tends to be improved.

The curing catalyst (curing accelerator) is not particularly limited, and examples thereof include a tertiary amine compound such as 1,8-diaza-bicyclo (5,4,0) undecene-7, triethylenediamine, tri-2,4,6-dimethylaminomethylphenol; an imidazole compound such as 2-ethyl-4-methylimidazole and 2-methylimidazole; a phosphorus compound such as triphenylphosphine, tetraphenylphosphonium tetraphenylborate, tetra-n-butylphosphonium-o,o-diethylphosphorodithioate, tetra-n-butylphosphonium-tetrafluoroborate, and tetra-n-butylphosphonium-tetraphenylborate; a quaternary ammonium salt; an organic metal salt; and a derivative thereof. Among these curing accelerators, it is preferable to use an imidazole compound (D') such as 2-ethyl-4-methylimidazole or 2-methylimidazole.

These (D) curing catalysts (curing accelerators) may be used singly or in combination of two or more kinds thereof. In a case in which the (D) curing catalyst (curing accelerator) is contained, from the viewpoints of heat resistance, transparency and chemical resistance of a film (aggregate), a content of the (D) curing catalyst (curing accelerator) is preferably from 0.1 parts by mass to 50 parts by mass and more preferably from 0.5 parts by mass to 20 parts by mass based on 100 parts by mass of the (B) epoxy compound.

(E) Solvent

A curable composition may further include a (E) solvent. The (E) solvent is not particularly limited as long as the solvent dissolves or disperses respective components, and examples thereof include γ-butyrolactone, ethyl lactate, propylene glycol monomethyl ether acetate, butyl acetate, benzyl acetate, n-butyl acetate, ethoxyethyl propionate, 3-methyl methoxypropionate, N-methyl-2-pyrrolidone, N-cyclohexyl-2-pyrrolidone, N,N-dimethylformamide, N,N-dimethylacetamide, hexamethylphosphorylamide, tetramethylene sulfone, diethyl ketone, diisobutyl ketone, methyl amyl ketone, cyclohexanone, propylene glycol monomethyl ether, propylene glycol monopropyl ether, propylene glycol monobutyl ether, dipropylene glycol monomethyl ether, xylene, mesitylene, ethylbenzene, propylbenzene, cumene, diisopropylbenzene, hexylbenzene, anisole, diglyme, dimethylsulfoxide, chloroform, dichloromethane, dichloroethane, and chlorobenzene. These solvents may be used singly, or may be used in combination of two or more kinds thereof.

In a case in which the (E) solvent is contained, a content of the (E) solvent is preferably from 10 parts by mass to 95 parts by mass, and more preferably from 5 parts by mass to 90 parts by mass based on a total amount of 100 parts by mass of the (A) polyketone, the (B) epoxy compound, and if necessary, the (C) dicarboxylic acid anhydride, the (D) curing catalyst (curing accelerator), and the (E) solvent.

(F) Other Additives

The polyketone composition may further contain other additives. Examples of the other additives include adhesion aids, surfactants, leveling agents, antioxidants, and UV deterioration inhibitors.

<Polyketone Cured Product>

A polyketone cured product in the present embodiment is a cured product of the polyketone composition in the present embodiment.

A method of producing the polyketone cured product in the present embodiment is not particularly limited. For example, the polyketone composition in the present embodiment containing a solvent is applied to the surface of at least a part of a substrate to form a composition layer, and the layer if necessary is dried to remove the solvent from the composition layer, whereby a polyketone cured product in the present embodiment can be produced.

The method of applying the polyketone composition to a substrate is not particularly limited as long as the method is a method in which the composition layer can be formed in an arbitrary shape on an arbitrary position on a substrate. Examples of the method of applying the polyketone composition to a substrate include dipping, spraying, screen printing, spin coating, spin coating, and bar coating.

The substrate to which the polyketone composition is applied is not particularly limited, and examples thereof include a transparent substrate composed of inorganic material such as glass, semiconductor, metal oxide insulator (titanium oxide, silicon oxide or the like), and silicon nitride; a transparent resin such as triacetyl cellulose, transparent polyimide, polycarbonate, acrylic polymer, and a cycloolefin resin. A shape of the substrate is not particularly limited, and may be a plate shape or a film shape. The polyketone composition in the present embodiment which is excellent in chemical resistance even when formed into a cured product can be suitably used as a coating material for a substrate, a molded article, or the like.

The method of curing the polyketone composition is not particularly limited, and the composition can be cured by heat treatment or the like. Curing by heat treatment can be performed using an oven such as a box type dryer, a hot air type conveyor dryer, a quartz tube furnace, a hot plate, a rapid thermal annealing, a vertical type diffusion furnace, an infrared curing furnace, an electron beam curing furnace, or a microwave curing furnace.

An atmosphere during curing may be either in the air or in an inert atmosphere such as nitrogen, and from the viewpoint of preventing oxidation of the polyketone composition, curing is preferably carried out under a nitrogen atmosphere.

A temperature and time of the heat treatment for curing can be arbitrarily set in consideration of composition conditions, working efficiency and the like, and may be about from 60° C. to 200° C. for about from 30 minutes to 2 hours.

In a case in which the polyketone composition contains the (E) solvent, the composition may be dried. The drying method is not particularly limited, and examples thereof include a method of heat treatment using an apparatus such as a hot plate or an oven, and a method of natural drying. The conditions for the heat treatment for drying are not particularly limited as long as the (E) solvent in the polyketone composition is sufficiently volatilized, and are usually about from 50° C. to 150° C. for about from 1 minute to 90 minutes.

If necessary, the dried polyketone cured product may be further heat-treated in order to completely remove a residual solvent. The method of heat treatment is not particularly limited, and the heat treatment can be carried out using an oven such as a box dryer, a hot air conveyor dryer, a quartz tube furnace, a hot plate, a rapid thermal annealing, a vertical diffusion furnace, an infrared curing oven, an electron beam curing oven, a microwave curing oven, or a vacuum dryer. An atmospheric conditions in the heat treatment are not particularly limited, and examples thereof include atmospheric air and an inert atmosphere such as nitrogen. Conditions for carrying out the heat treatment are not particularly limited, and the conditions are about from 150° C. to 250° C. for about from 1 minute to 90 minutes. Further heat treatment tends to increase a density of the polyketone cured product to be obtained.

The obtained polyketone cured product can be used as a substrate with polyketone cured product in which the substrate remains to be attached, and can also be used after being peeled off from the substrate if necessary.

In the substrate with polyketone cured product, the polyketone cured product may be provided on at least a part of the surface of the substrate, and the polyketone cured product may be provided only on one side of the substrate or on both sides of the substrate. In the substrate with polyketone cured product, the polyketone cured product may have a single layer structure or a multilayer structure in which two or more layers are stacked.

<Optical Element and Image Display Device>

Each of an optical element and an image display device in the present embodiment includes the polyketone cured product in the present embodiment. The polyketone cured product applied to the optical element or the image display device may be the substrate with polyketone cured product as described above. In a case in which the substrate is a transparent substrate, the substrate can be suitably used for an optical element. Examples of the transparent substrate include those exemplified in the production of a polyketone cured product.

The optical element and the image display device can be obtained, for example, by adhering the substrate side of a substrate with a polyketone cured product to an application site such as an LCD (liquid crystal display) or an ELD (electroluminescence display) via an gluing agent, an adhesive agent or the like.

The polyketone cured product and a variety of optical elements such as a polarizing plate using the same can be preferably used for a variety of image display devices such as a liquid crystal display device. The image display device may have the same configuration as that of a conventional image display device except that the polyketone cured product in the present embodiment is used. In a case in which the image display device is a liquid crystal display device, the device can be produced by appropriately assembling an optical element such as a liquid crystal cell or a polarizing plate, and, if necessary, a variety of components such as a lighting system (backlight or the like), and incorporating a driving circuit. The liquid crystal cell is not particularly limited, and a variety of types such as a TN type, an STN type, or a π type can be used.

Examples of applications of the image display device include office equipment such as a desktop personal computer, a laptop computer, or a copy machine, a mobile device such as a mobile phone, a watch, a digital camera, a personal digital assistant (PDA), or a portable game machine; a household electric appliance such as a video camera, a television, or a microwave oven; in-vehicle equipment such as a back monitor, a car navigation system monitor, or a car audio; exhibition equipment such as a monitor for information for commercial store; security equipment such as a surveillance monitor; nursing care equipment such as a nursing care monitor; and medical equipment such as a medical monitor.

The entire contents of the present disclosures by Japanese Patent Application No. 2016-046182 filed on Mar. 9, 2016 are incorporated herein by reference.

All the literature, patent application, and technical standards cited herein are also herein incorporated to the same extent as provided for specifically and severally with respect to an individual literature, patent application, and technical standard to the effect that the same should be so incorporated by reference.

EXAMPLES

The present embodiments will be described in more details below by way of Examples, provided that the present invention be not restricted in any way by the following Examples.

<Polyketone Composition>

The components (A) to (E) were blended in proportions shown in Table 1 (parts by mass in the parentheses), and filtered with a PTFE filter to obtain polyketone compositions of Examples and Comparative Examples. Components in Table 1 are as follows.

(A) Component

A component A synthesized by the following method was used.

Synthesis Example 1

Synthesis of Polyketone PK-1

To a flask containing 3.5 mmol of 2,2'-dimethoxybiphenyl and 4.5 mmol of 1,3-adamantane dicarboxylic acid, 12 ml of a mixed solution of diphosphorus pentoxide and methanesulfonic acid (mass ratio 1:10) was added, and then the mixture was allowed to react at 60° C. with stirring. After the reaction, the contents were poured into a mixed solution of 80 ml of methanol and 120 ml of tetrahydrofuran, and a precipitate formed was collected by filtration. The obtained solid was washed with distilled water and methanol, and then dried to obtain polyketone PK-1. A weight average molecular weight of the polyketone PK-1 was 280,000 and a number average molecular weight was 44,000 as determined by standard polystyrene equivalent GPC method.

Synthesis Example 2

Synthesis of Polyketone PK-2

To a flask containing 10 mmol of 2,2'-dimethoxybiphenyl, 5 mmol of 1,3-adamantane dicarboxylic acid and 5 mmol of dodecanedioic acid, 30 ml of a mixed solution of diphosphorus pentoxide and methanesulfonic acid (mass ratio 1:10) was added, and then the mixture was stirred at 60° C. for 40 hours. After the reaction, the reaction liquid was poured into 500 ml of methanol, and a precipitate formed was collected by filtration. The obtained solid was washed with distilled water and methanol, and then dried to obtain polyketone PK-2. A weight average molecular weight of the polyketone PK-2 was 30,000 and a number average molecular weight was 5,000 as determined by standard polystyrene equivalent GPC method.

Synthesis Example 3

Synthesis of Polyketone PK-3

To a flask containing 10 mmol of 2,2'-dimethoxybiphenyl and 10 mmol of 1,3-adamantane diacetic acid, 30 ml of a mixed solution of diphosphorus pentoxide and methanesulfonic acid (mass ratio 1:10) was added, and a nitrogen balloon was attached, and then the mixture was stirred at 60° C. for 40 hours. After the reaction, the reaction liquid was poured into 500 ml of methanol, and a precipitate formed was collected by filtration. The obtained solid was washed with distilled water and methanol, and then dried to obtain polyketone PK-3. A weight average molecular weight of the polyketone PK-3 was 80,000 and a number average molecular weight was 20,000 as determined by standard polystyrene equivalent GPC method.

(B) Component

An epoxy compound represented by the following Formula (VI) ("850-S" DIC CORPORATION, bisphenol A type glycidyl ether, epoxy equivalent: 188 g/eq) was used as B1.

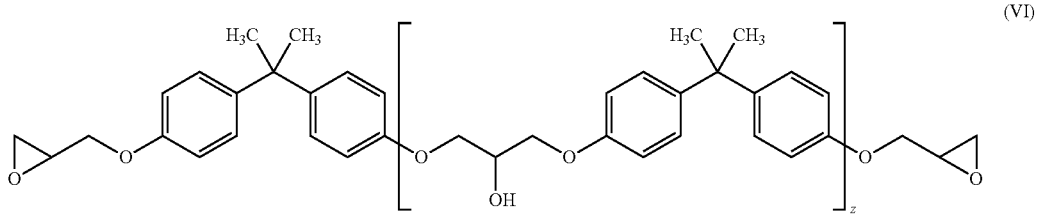

(VI)

An epoxy compound represented by the following Formula (VII) ("CELLOXIDE 2021P" Daicel Corporation, alicyclic epoxy compound) was used as B2.

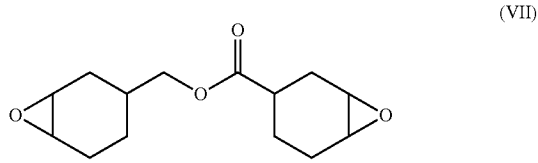 [SMILES: O=C(OCC1CCC2OC2C1)C1CCC2OC2C1]

(VII)

Triglycidyl-p-aminophenol was used as an epoxy compound B3.

(C) Component 3- or 4-methylhexahydrophthalic anhydride ("HN-5500" Hitachi Chemical Co., Ltd.) was used as a dicarboxylic acid anhydride C1.

(D) Component 2-ethyl-4-methyl imidazole ("2E4MZ" SHIKOKU CHEMICALS CORPORATION, imidazole compound) was used as a curing catalyst (curing accelerator) D'1.

(E) Component

N-methyl-2-pyrrolidone (Wako Pure Chemical Industries, Ltd.) was used as a solvent E1.

TABLE 1

| Composition | (A) Polyketone | (B) Epoxy Compound | (C) Dicarboxylic anhydride | (D) Curing Accelerator | (E) Solvent |
|---|---|---|---|---|---|
| Example 1 | PK-1 (100) | B1 (15) | C1 (13) | D'1 (2) | E1 (300) |
| Example 2 | PK-1 (100) | B2 (15) | C1 (13) | D'1 (2) | E1 (300) |
| Example 3 | PK-1 (100) | B3 (15) | C1 (13) | D'1 (2) | E1 (300) |
| Example 4 | PK-2 (100) | B1 (15) | C1 (13) | D'1 (2) | E1 (300) |
| Example 5 | PK-2 (100) | B2 (15) | C1 (13) | D'1 (2) | E1 (300) |
| Example 6 | PK-2 (100) | B3 (15) | C1 (13) | D'1 (2) | E1 (300) |
| Example 7 | PK-3 (100) | B1 (15) | C1 (13) | D'1 (2) | E1 (300) |
| Example 8 | PK-3 (100) | B2 (15) | C1 (13) | D'1 (2) | E1 (300) |
| Example 9 | PK-3 (100) | B3 (15) | C1 (13) | D'1 (2) | E1 (300) |
| Comparative Example 1 | PK-1 (100) | — | — | — | E1 (230) |
| Comparative Example 2 | PK-2 (100) | — | — | — | E1 (230) |
| Comparative Example 3 | PK-3 (100) | — | — | — | E1 (230) |

<Polyketone Cured Product>

Polyketone cured product was obtained using the polyketone compositions obtained in Examples 1 to 9 or Comparative Examples 1 to 3 by the following method.

(1) For Chemical Resistance Test and Elastic Modulus Measurement

A polyketone composition was applied to a silicon substrate by a spin coating method. The obtained silicon substrate was dried on a hot plate heated to 120° C. for 3 minutes. Further, the dried silicon substrate was heat-treated at 200° C. for 1 hour in a nitrogen stream using an inert gas oven (Koyo Thermo System Co., Ltd.) to obtain a silicon substrate with polyketone cured product.

(2) For Transmittance Measurement

A polyketone composition was applied to a glass substrate by a spin coating method. The obtained glass substrate was dried and heat-treated in the same manner as in (1) to obtain a glass substrate with polyketone cured product.

(3) For Thermal Decomposition Temperature Measurement

The polyketone composition was dropped into an aluminum cup, dried and heat-treated in the same manner as in (1) to obtain a solid resin. This solid resin was peeled off from the aluminum cup to obtain a polyketone cured product.

<Molecular Weight Measurement of Specific Polyketone>

A molecular weight (weight average molecular weight and number average molecular weight) of the (A) component was measured by a GPC method using tetrahydrofuran (THF) in which 0.1% by mass of tetrabutylammonium nitrate (TBA·NO$_3$) was dissolved as an eluent, and was determined based on standard polystyrene. Details are as follows.

Device name: RI-8020 (RI detector), DP-8020 (pump), SD-8022 (degasser) (TOSOH CORPORATION)

Column: Gelpack GL-A150, GL-A160, GL-A170 (trade name, Hitachi Chemical Co., Ltd.)

Eluent: Tetrahydrofuran (THF) in which 0.1% by mass of tetrabutylammonium nitrate (TBA·NO$_3$) was dissolved Flow velocity: 1 ml/minutes Standar reference material: Polystyrene <Chemical Resistance Test of Polyketone Cured Product>

A silicon substrate with polyketone cured product was singulated to prepare test pieces, and the test pieces were immersed in a chemical solution under the following condition (a) or (b). It was observed whether the cured resin was dissolved during immersion or whether the cured resin was peeled off from the silicon substrate. The observation results are shown in Table 2. In this test, a case in which dissolution and peeling were not observed was taken as "no change".

(a) A mixed solution containing dimethylsulfoxide (DMSO) and 2-ethanolamine (2AE) in a volume ratio (DMSO: 2AE)=7:3 was heated to 60° C., and the test piece was immersed for 30 minutes.

(b) The test piece was immersed in a 0.5% by mass hydrofluoric acid (HF) aqueous solution at 23° C. for 30 minutes.

<Measurement of Elastic Modulus of Polyketone Cured Product>

The silicon substrate with polyketone cured product was singulated and a elasticmodulus of the polyketone cured product was measured using a nanoindenter Nano Indenter SA2/DCM (Agilent Technologies Japan, Ltd.). Using triangular pyramidal diamond as a terminal, measurement was carried out under conditions of a measurement frequency of 60 MHz, an indentation depth from 0 nm to 500 nm, and a measurement temperature of 23° C. The results are shown in Table 2.

<Measurement of Transmittance of Polyketone Cured Product>

A transmittance of visible light at 400 nm of a glass substrate with polyketone cured product was measured by an ultraviolet-visible absorption spectroscopy using V-570 (JASCO Corporation). The transmittance of the film converted to 1 µm in film thickness is shown in Table 2 using a glass substrate without polyketone cured product as a reference.

<Thermal Decomposition Temperature Measurement of Polyketone Cured Product>

Weight loss of cured polyketone product was measured using a thermogravimetric balance TG-DTA 6300 (Hitachi High-Tech Sciences Corporation (Hitachi High-Technologies Corporation)). A point of intersection of the tangent of the curve whose weight is greatly reduced by heating is defined as a thermal decomposition temperature. The results are shown in Table 2.

TABLE 2

| Polyketone Cured Product | Chemical Resistance Test | | Elastic Modulus [GPa] | Transmittance [%] | Thermal Decomposition Temperature [° C.] |
|---|---|---|---|---|---|
| | Condition (a) | Condition (b) | | | |
| Example 1 | no change | no change | 6.3 | 96 | 445 |
| Example 2 | no change | no change | 6.6 | 98 | 450 |
| Example 3 | no change | no change | 6.8 | 97 | 440 |
| Example 4 | no change | no change | 2.7 | 96 | 420 |
| Example 5 | no change | no change | 3.0 | 98 | 425 |

TABLE 2-continued

| Polyketone Cured Product | Chemical Resistance Test | | Elastic Modulus [GPa] | Transmittance [%] | Thermal Decomposition Temperature [° C.] |
| --- | --- | --- | --- | --- | --- |
| | Condition (a) | Condition (b) | | | |
| Example 6 | no change | no change | 3.2 | 97 | 415 |
| Example 7 | no change | no change | 1.0 | 90 | 450 |
| Example 8 | no change | no change | 1.5 | 90 | 455 |
| Example 9 | no change | no change | 1.8 | 90 | 450 |
| Comparative Example 1 | dissolution | peeling | 6.4 | 98 | 440 |
| Comparative Example 2 | dissolution | peeling | 2.5 | 98 | 410 |
| Comparative Example 3 | dissolution | peeling | 0.9 | 90 | 445 |

Reference Experiment Example

<Polyketone Recovery Experiment>

The chemical solution (DMSO/2AE) after the chemical resistance test in Comparative Example 3 was dropped into a precipitation tube containing pure water. The resulting suspension was separated into a supernatant and a precipitate by a centrifugal separator. The supernatant was removed and the precipitate was lyophilized. A molecular weight of the obtained solid (precipitate) was measured by the above method. As a result, the weight average molecular weight was 80,000, and the number average molecular weight was 30,000. It was found that the polyketone PK3 was not decomposed by a chemical solution and that the molecular chain of the polyketone itself was stable to chemical solutions.

It was found that the curedpolyketone product obtained from the polyketone composition of Examples had excellent transparency and heat resistance and were excellent in practical chemical resistance.

The invention claimed is:

1. A polyketone composition comprising:
(A) a polyketone having, in a main chain, a structural unit represented by the following Formula (I); and
(B) an epoxy compound,

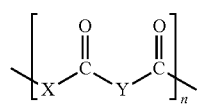
(I)

wherein, in Formula (I), X represents a bivalent group that has from 1 to 50 carbon atoms and that may have a substituent group, n represents an integer from 1 to 1500, and Y represents a bivalent hydrocarbon group having an adamantane structure and represented by the following Formula (IV):

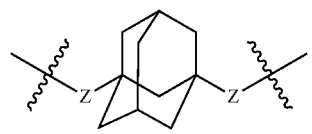
(IV)

wherein, in Formula (IV), hydrogen atom(s) of the adamantane structure may be substituted with a hydrocarbon group, an amino group, an oxo group, a hydroxyl group, or a halogen atom, and each Z independently represents a bivalent saturated hydrocarbon group that has from 1 to 10 carbon atoms and that may have a substituent.

2. The polyketone composition according to claim 1, wherein in Formula (I), X is a bivalent group that includes an aromatic ring and that has from 6 to 50 carbon atoms.

3. The polyketone composition according to claim 1, wherein in Formula (I), X is a bivalent group represented by at least one selected from the group consisting of the following formula (II-1) to (II-3),

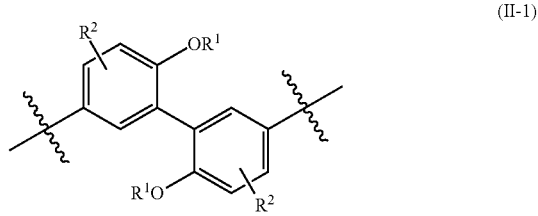
(II-1)

wherein, in Formula (II-1), each $R^1$ independently represents a hydrogen atom or a hydrocarbon group that has from 1 to 30 carbon atoms and that may have a substituent group, and each $R^2$ independently represents a hydrogen atom or a hydrocarbon group that has from 1 to 30 carbon atoms and that may have a substituent group,

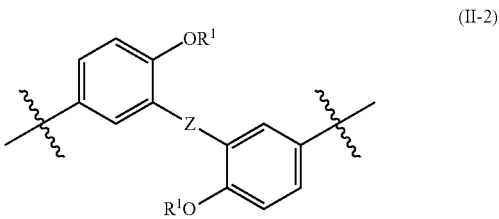
(II-2)

wherein, in Formula (II-2), each $R^1$ independently represents a hydrogen atom or a hydrocarbon group that has from 1 to 30 carbon atoms and that may have a substituent group, and Z represents an oxygen atom or a bivalent group represented by the following formula (III-1) to (III-7),

(III-1)

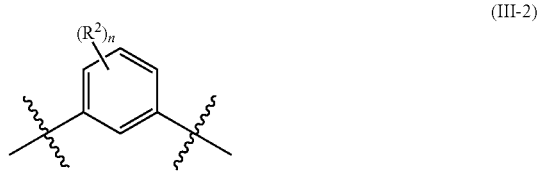
(III-2)

-continued

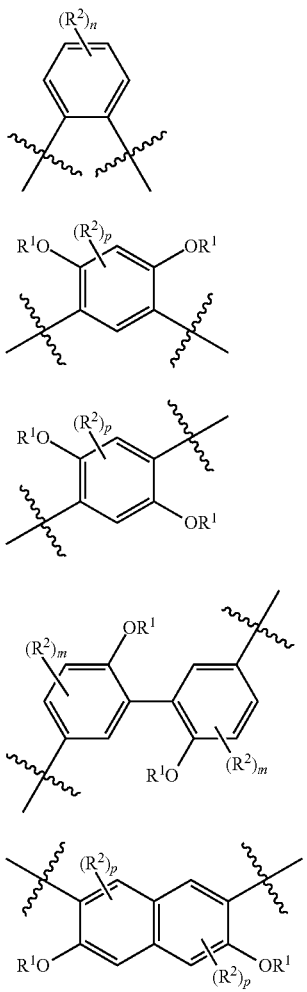

(III-3)

(III-4)

(III-5)

(III-6)

(III-7)

wherein, in Formulae (III-1) to (III-7), each $R^1$ independently represents a hydrogen atom or a hydrocarbon group that has from 1 to 30 carbon atoms and that may have a substituent group, each $R^2$ independently represents a hydrocarbon group that has from 1 to 30 carbon atoms and that may have a substituent group, each of $R^3$ and $R^4$ independently represents a hydrogen atom or a hydrocarbon group that has from 1 to 30 carbon atoms and that may have a substituent group, each m independently represents an integer from 0 to 3, each n independently represents an integer from 0 to 4, and each p independently represents an integer from 0 to 2,

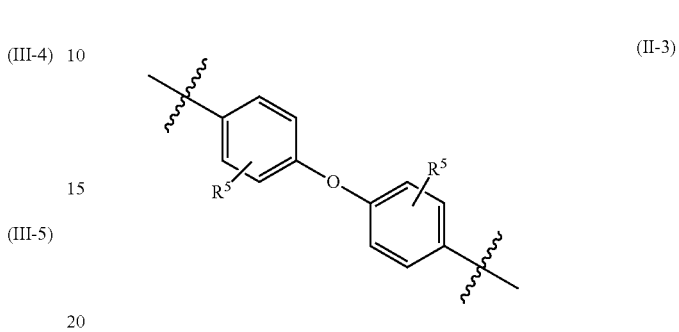

(II-3)

wherein, in Formula (II-3), each $R^5$ independently represents a hydrogen atom or a hydrocarbon group that has from 1 to 30 carbon atoms and that may have a substituent group.

4. The polyketone composition according to claim 1, wherein (B) the epoxy compound comprises an epoxy compound having from 2 to 4 of epoxy groups in a molecule.

5. The polyketone composition according to claim 1, further comprising a dicarboxylic anhydride.

6. The polyketone composition according to claim 1, further comprising a curing catalyst.

7. The polyketone composition according to claim 6, wherein the curing catalyst comprises an imidazole compound.

8. The polyketone composition according to claim 1, further comprising a solvent.

9. A cured polyketone that is a cured product of the polyketone composition according to claim 1.

10. An optical element comprising the cured polyketone according to claim 9.

11. An image display device comprising the cured polyketone according to claim 9.

12. The polyketone composition according to claim 1, wherein in Formula (IV), each Z represents a saturated hydrocarbon group having from 1 to 5 carbon atoms.

* * * * *